W. V. TURNER.
ANGLE COCK DEVICE.
APPLICATION FILED NOV. 1, 1907.
1,015,856.
Patented Jan. 30, 1912.
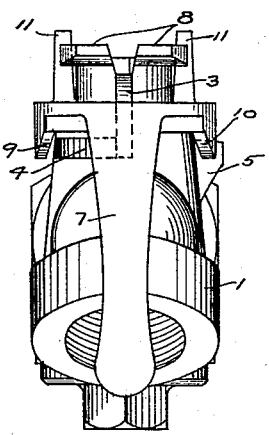
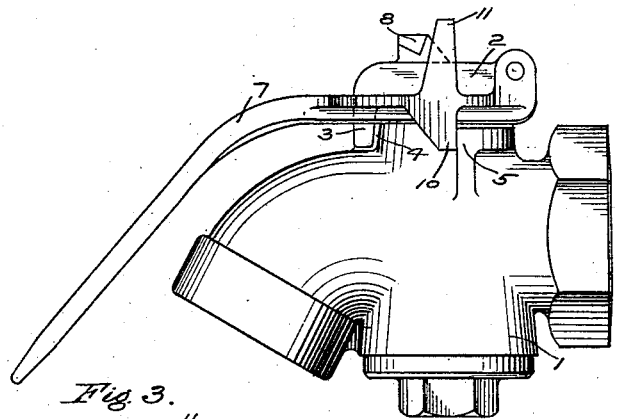
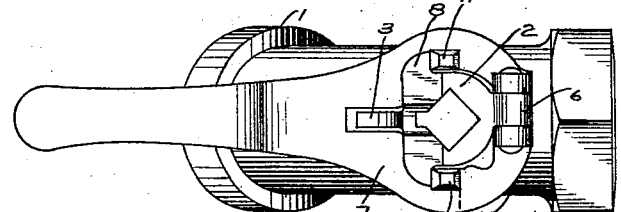
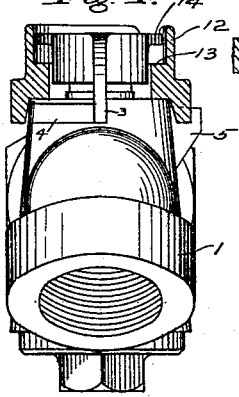
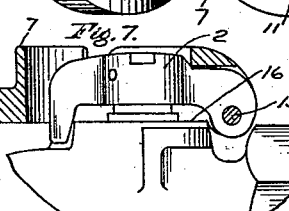
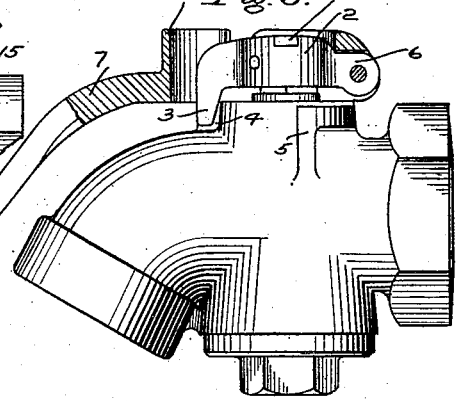
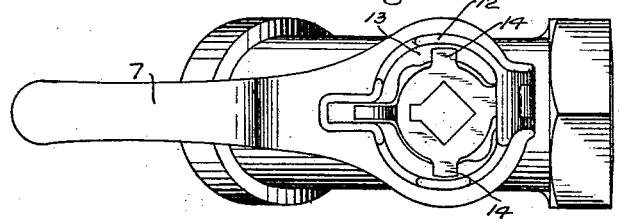
WITNESSES
Wm. M. Cady
J. S. Custer
INVENTOR
Walter V. Turner
by E. Wright
Att'y.

UNITED STATES PATENT OFFICE.

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

ANGLE-COCK DEVICE.

1,015,856.

Specification of Letters Patent. Patented Jan. 30, 1912.

Application filed November 1, 1907. Serial No. 400,183.

*To all whom it may concern:*

Be it known that I, WALTER V. TURNER, a citizen of the United States, residing at Edgewood, in the county of Allegheny and State of Pennsylvania, have invented new and useful Improvements in Angle-Cock Devices, of which the following is a specification.

This invention relates to stop cocks, and more particularly to stop cocks and angle cocks for train pipes in fluid pressure brake systems.

The train pipe angle cock is sometimes used as a stepping place by railway employees, or others, in climbing upon the end of a car, and as a consequence, the pressure thus applied to the top of the plug cock is liable to loosen the cock in its seat, so as to permit leakage or even to permit the handle to be jarred or shifted to a more or less closed position, the result of which is often serious.

With self locking angle cock handles such as covered in Reissue Patent No. 12574, of Dec. 11, 1906, and my prior pending application, Ser. No. 363711, filed March 21, 1907, the above result may also occur, and therefore the main object of my present invention is to provide means, adapted more particularly for use in connection with a self locking angle cock handle, for protecting the plug cock so as to prevent the application of any pressure thereto tending to displace the cock from its seat.

In the accompanying drawing, Figures 1, 2 and 3 are respectively front, side and plan views of an ordinary angle cock, provided with a self locking handle, with one form of my invention applied thereto; Figs. 4, 5 and 6, similar views with another form of my invention applied; and Fig. 7 a part sectional view of the upper part of an angle cock and locking handle, showing a slightly modified form of construction.

According to the drawing, which shows an angle cock equipped with a self locking handle, similar to that covered in my prior pending application, hereinbefore mentioned, the construction comprises an ordinary angle cock 1, a key plate 2, with a squared opening to fit over the upper end of the plug cock, and having a lug 3 for engaging the usual fixed stops 4 and 5 on the angle cock body, to define the open and the closed positions of the plug cock.

To the rearwardly extending lug 6, of the key plate 2, is pivoted the locking handle 7, having a central opening in its body portion for the key plate and plug cock. The body portion of the handle is provided with downwardly extending lugs 9 and 10 on opposite sides, for engaging lugs 4 and 5 respectively in the closed and open positions of the plug cock, and the key plate 2 may be provided with an upwardly extended portion, having outwardly projecting lugs 8, for engaging, and thereby limiting the upward movement of the handle.

In order to protect the plug cock and prevent the application of pressure or a weight tending to displace the cock inwardly, and away from its seat, I provide, according to Figs. 1 to 3, upwardly extending lugs 11 on the body portion of the handle 7, said lugs extending somewhat above the plug cock and key plate, or, where the stops 8 are applied, above them, so that a weight pressing down will rest on the lugs 11, without coming in contact with the plug cock.

A slightly different construction is illustrated in Figs. 4 to 6, in which an upwardly projecting flange 12, on the body portion of the valve handle, extends around the central opening thereof. The flange need not be continuous, but may be cut away in places, as shown, and, of course, extends somewhat above the key plate 2. In place of the limiting stops 8, I may provide a shoulder portion 13 on the interior of the central opening of the body portion, to engage fixed lugs 14, projecting outwardly from the key plate 2, in order to limit the upward movement of the handle. When pressure is exerted upon the lugs 11 or the flange 12, it will be evident that the handle 7 will bear upon the upper surface of the valve casing.

In the construction shown in Fig. 2 if pressure is applied to the top of the cock handle in such a manner as would tend to turn the cock around a pull will be exerted from the pivot pin which will force the lug 10, for example, against the stop 5. As the line of pull is at an angle to the engaging face of the stop 5 there is a tendency for the lug 10 to lift up and disengage from the stop 5. In order to obviate any possible tendency to lift, the pivot pin may be arranged as shown in Fig. 7, in which the pivot pin 15 is dropped down to a point substantially in line with the top face of the cock body.

Having now described my invention, what I claim as new and desire to secure by Letters Patent is:—

1. In a stop cock device, the combination with a plug cock or valve, a casing therefor, and a pivoted handle for operating said plug cock, of means for protecting the plug cock from pressure tending to move the same from its seat.

2. In a stop cock device, the combination with a plug cock or valve, a casing therefor, a handle therefor, and means for locking the cock against accidental movement, of means on said handle for protecting said cock from the action of a weight tending to displace the cock from its seat in the casing.

3. In a stop cock device, the combination with a plug cock or valve, and a casing therefor, of a handle device for said cock, comprising a key plate secured to the cock key, a handle pivoted to said key plate, and lugs mounted on the handle and extending outwardly beyond said key plate and cock, to protect the same from the pressure of a weight tending to displace the cock from its seat.

4. In a stop cock device, the combination with a plug cock, a casing therefor, of a handle device for operating said cock, comprising a key plate secured to the cock key, a handle member pivoted to said key plate, stops, and lugs on said handle member for engaging said stops in the open and in the closed positions of the cock, and means on said handle member for preventing the application of pressure on the plug cock and key plate, tending to displace the cock from its normal seat.

5. In a stop cock device, the combination with a plug cock or valve, a casing therefor, and a pivoted handle for operating said plug cock, of means for preventing pressure from acting on the plug cock tending to unseat the same.

6. A stop cock device comprising a plug cock, a casing therefor, a pivoted handle for operating said cock, and a stop member for limiting the movement of the handle, the pivot of the handle being located on a line substantially normal to the engaging surface of the stop.

In testimony whereof I have hereunto set my hand.

WALTER V. TURNER.

Witnesses:
R. F. EMERY,
WM. M. CADY.

---

Copies of this patent may be obtained for five cents each, by addressing the "Commissioner of Patents, Washington, D. C."